United States Patent
Yu et al.

(10) Patent No.: US 9,680,375 B2
(45) Date of Patent: Jun. 13, 2017

(54) SWITCHING MODE POWER SUPPLY WITH ADAPTIVELY RANDOMIZED SPREAD SPECTRUM

(71) Applicant: TEXAS INSTRUMENTS INCORPORATED, Dallas, TX (US)

(72) Inventors: Theodore Ernest Yu, San Jose, CA (US); Ali Motamedi, San Jose, CA (US); Dingkun Du, Sunnyvale, CA (US); Sombuddha Chakraborty, Redwood City, CA (US); Patrick Teterud, Plano, TX (US); Keith Thomas Sanders, Jr., San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 161 days.

(21) Appl. No.: 14/631,388

(22) Filed: Feb. 25, 2015

(65) Prior Publication Data
US 2015/0244269 A1 Aug. 27, 2015

Related U.S. Application Data

(60) Provisional application No. 61/944,846, filed on Feb. 26, 2014.

(51) Int. Cl.
*H02M 3/156* (2006.01)
*H02M 1/44* (2007.01)
*H02M 1/00* (2006.01)

(52) U.S. Cl.
CPC ............. *H02M 3/156* (2013.01); *H02M 1/44* (2013.01); *H02M 2001/0012* (2013.01)

(58) Field of Classification Search
CPC .......... H02M 1/44; H02M 3/156; H02M 1/14; H02M 1/143; H02M 1/15;
(Continued)

(56) References Cited

U.S. PATENT DOCUMENTS 6,100,675 A * 8/2000 Sudo ............... H02M 3/156
323/282
6,278,265 B1 8/2001 Yokosawa
(Continued)

FOREIGN PATENT DOCUMENTS

| RU | 96124397 A | 2/1999 |
| SU | 1597876 A1 | 10/1990 |
| WO | 2009115962 A1 | 9/2009 |

OTHER PUBLICATIONS

International Search Report and Written Opinion for PCT/US2015/017813 mailed Aug. 27, 2015.

*Primary Examiner* — Gary L Laxton
*Assistant Examiner* — Jye-June Lee
(74) *Attorney, Agent, or Firm* — Michael A. Davis, Jr.; Charles A. Brill; Frank D. Cimino (57) ABSTRACT

In described examples, a switching mode power supply includes an output filter, a driver, a pulse width modulator, and pulse adaptation circuitry. The output filter is configured to provide output of the switching mode power supply. The driver is coupled to the output filter and is configured to switch current to the output filter. The pulse width modulator is configured to generate pulses that control switching of current by the driver. The pulse width modulator includes spread spectrum logic configured to randomize timing of the pulses generated by the pulse width modulator. The pulse adaptation circuitry is configured to identify an instantaneous excursion of the output of the switching mode power supply beyond a predetermined threshold, and to modify the randomized timing of the pulses produced by the pulse width modulator based on the identified instantaneous excursion.

19 Claims, 6 Drawing Sheets

(58) Field of Classification Search
CPC . H02M 2001/0003; H02M 2001/0006; H02M 2001/0012; H02M 2001/0016; H02M 2001/0019; H02M 2001/0022; H02M 2001/0025; H02M 2001/0029; H02M 2001/0041; G05F 1/462; G05F 1/467; G05F 1/468
USPC .......................................... 323/246, 271, 282
See application file for complete search history.

(56) References Cited

U.S. PATENT DOCUMENTS

| | | | | |
|---|---|---|---|---|
| 2006/0158163 | A1* | 7/2006 | Machesney | H02M 3/1584 323/246 |
| 2011/0012575 | A1* | 1/2011 | Midya | H02M 1/44 323/282 |
| 2012/0212197 | A1* | 8/2012 | Fayed | H02M 3/158 323/271 |
| 2014/0159686 | A1* | 6/2014 | Lee | H02M 3/156 323/282 |

* cited by examiner

SWITCHING MODE POWER SUPPLY WITH ADAPTIVELY RANDOMIZED SPREAD SPECTRUM

CROSS-REFERENCE TO RELATED APPLICATIONS

This application claims priority to U.S. Provisional Patent Application No. 61/944,846, filed Feb. 26, 2014, titled "SYSTEM AND ALGORITHM FOR ULTRA-LOW EMI SWITCHING MODE POWER SUPPLY THROUGH ADAPTIVELY RANDOMIZED SPREAD SPECTRUM," which is hereby incorporated herein by reference in its entirety.

BACKGROUND

A switching mode power supply is an electronic circuit that converts an input direct current (DC) supply voltage into one or more DC output voltages that are higher or lower in magnitude than the input DC supply voltage. A switching mode power supply that generates an output voltage lower than the input voltage is termed a buck or step-down converter. A switching mode power supply that generates an output voltage higher than the input voltage is termed a boost or step-up converter.

A typical switching mode power supply includes a switch for alternately opening and closing a current path through an inductor in response to a switching signal. In operation, a DC voltage is applied across the inductor. Electrical energy is transferred to a load connected to the inductor by alternately opening and closing the switch as a function of the switching signal. The amount of electrical energy transferred to the load is a function of the duty cycle of the switch and the frequency of the switching signal. Switch-mode power supplies are widely used for powering electronic devices, particularly battery-powered devices, such as portable cellular phones, laptop computers, and other electronic systems in which efficient use of power is desirable.

SUMMARY

In described examples, a switching mode power supply includes an output filter, a driver, a pulse width modulator, and pulse adaptation circuitry. The output filter is configured to provide output of the switching mode power supply. The driver is coupled to the output filter and is configured to switch current to the output filter. The pulse width modulator is configured to generate pulses that control switching of current by the driver. The pulse width modulator includes spread spectrum logic configured to randomize timing of the pulses generated by the pulse width modulator. The pulse adaptation circuitry is configured to identify an instantaneous excursion of the output of the switching mode power supply beyond a predetermined threshold, and to modify the randomized timing of the pulses produced by the pulse width modulator based on the identified instantaneous excursion.

DETAILED DESCRIPTION OF EXAMPLE EMBODIMENTS

In described examples, a switching mode power supply includes adaptive spread spectrum pulse width modulation pulse generation. The pulse adaptation provides reduced electro-magnetic interference while also reducing ripple and/or providing other optimizations at the power supply output. In one embodiment, a switching mode power supply includes an output filter, a driver, a pulse width modulator, and pulse adaptation circuitry. The output filter is configured to provide output of the switching mode power supply. The driver is coupled to the output filter and is configured to switch current to the output filter. The pulse width modulator is configured to generate pulses that control switching of current by the driver. The pulse width modulator includes spread spectrum logic or algorithms configured to randomize timing of the pulses generated by the pulse width modulator. The pulse adaptation circuitry is configured to identify an instantaneous excursion of the output of the switching mode power supply beyond a predetermined threshold, and to modify the randomized timing of the pulses produced by the pulse width modulator based on the identified instantaneous excursion.

In another embodiment, a switching mode power supply includes an output filter, a driver, a pulse width modulator, a first feedback loop and a second feedback loop. The output filter is configured to provide output of the switching mode power supply. The driver is coupled to the output filter and is configured to switch current to the output filter. The pulse width modulator is configured to generate pulses that control switching of current by the driver. The pulse width modulator includes spread spectrum logic or algorithms configured to randomize timing of the pulses generated by the pulse width modulator. The first feedback loop is configured to compare an integrated output voltage of the switching mode power supply to a reference voltage that defines a desired output voltage of the switching mode power supply. The second feedback loop is configured to identify an instantaneous excursion of the output of the switching mode power supply beyond a predetermined threshold, and to modify the randomized timing of the pulses produced by the pulse width modulator based on the identified instantaneous excursion.

In a further embodiment, a switching mode power supply includes an output filter, a driver, a pulse width modulator, a first feedback loop and a second feedback loop. The output filter is configured to provide output of the switching mode power supply. The driver is coupled to the output filter and is configured to switch current to the output filter. The pulse width modulator is configured to generate pulses that control switching of current by the driver. The pulse width modulator includes spread spectrum logic or algorithms configured to randomize timing of the pulses generated by the pulse width modulator. The first feedback loop is configured to compare an integrated output voltage of the switching mode power supply to a reference voltage that defines a target output voltage of the switching mode power supply. The second feedback loop is configured to monitor the output of the switching mode power supply, to maintain a history defining values of the output of the switching mode power supply over an interval, and to modify the randomized timing of the pulses produced by the pulse width modulator based on the history.

Switching mode power supplies can provide high efficiency conversion of one voltage to another, and are therefore often employed in applications that require high conversion efficiency, such as battery powered systems. However, switching mode power supplies are subject to a number of issues. For example, the switching transitions within a switching mode power supply can produce unwanted electromagnetic interference (EMI) that detrimentally affects the operation of systems or devices proximate the switching mode power supply. Conventional techniques typically utilize shielding, filtering filter techniques, and or circuit layout to suppress EMI. These conventional techniques attempt to mitigate the effects of EMI, but fail to address the source of noise generation. The use of shielding and filter components also tends to increase system cost and size. Spread-spectrum enabled switched mode power supplies can alleviate EMI by randomizing the switching pulses, but conventional spread spectrum techniques may increase the output voltage ripple of the power supply and violate system design specifications.

The switching mode power supply disclosed herein reduces EMI without increasing power supply output ripple by applying a feedback loop to adaptively guide spread spectrum modulation and ensure that power supply operation conforms to predefined specifications. The adaptive guidance provided by the feedback can also be applied to improve transient response, response to load and line changes conditions, and other conditions affecting power supply performance.

Figure 1:
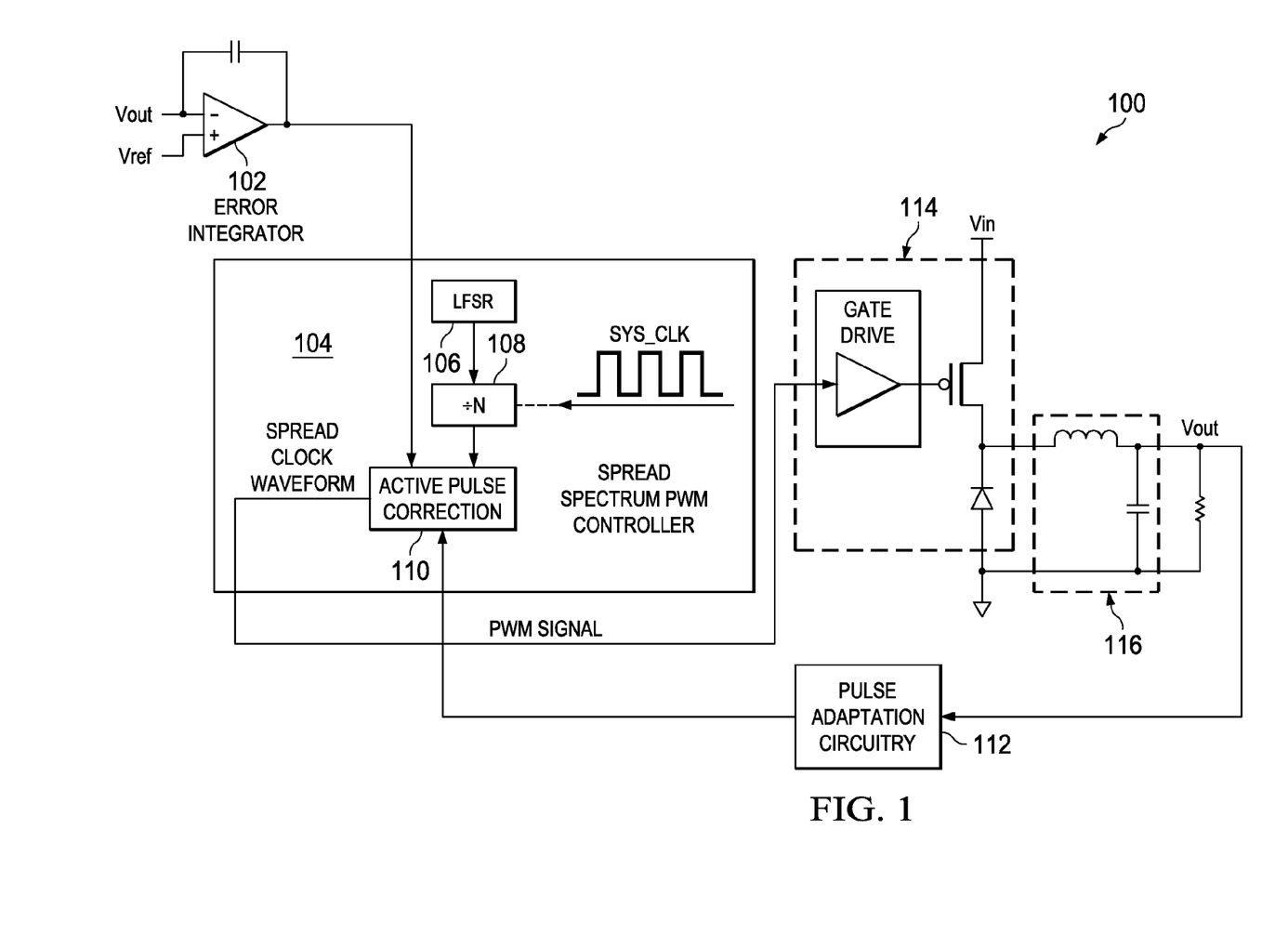
FIG. 1 is a block diagram of a switching mode power supply that includes adaptive spread spectrum pulse generation in accordance with various embodiments.

FIG. 1 shows a block diagram of a switching mode power supply 100 that includes adaptive spread spectrum pulse generation in accordance with various embodiments. The switching mode power supply 100 is illustrated as a buck converter, but the pulse adaptation techniques and principles disclosed herein are applicable to a variety of switching mode power supply architectures (such as boost converters and buck-boost converters) The switching mode power supply 100 includes a spread spectrum pulse width modulator (PWM) controller 104, drive circuitry 114, output filter 116, error integrator 102, and pulse adaptation circuitry 112. The spread spectrum PWM controller 104 generates pulses that control switching of the drive circuitry 114. The pulses generated by the spread spectrum PWM controller 104 vary in duration (e.g., vary in frequency) to increase the bandwidth over which power supply switching noise is spread, and correspondingly, to reduce the peak switching noise and EMI generated. Unfortunately, in conventional switching mode power supplies that employ spread spectrum pulse generation, the randomized variation in pulse timing can produce increased ripple in the output of the power supply.

The drive circuitry 114 switches current to the output filter 116 as dictated by the pulses generated by the spread spectrum PWM controller 104. The output filter 116 stores energy for delivery to a load powered by the power supply 100. The output of the filter 116, Vout, is routed to the error integrator 102 as part of a first feedback loop. The error integrator 102 determines the difference of the output voltage (Vout) of the output filter 116 and a reference voltage (Vref) that specifies a desired output voltage of the power supply 100. The difference is integrated and provided to the spread spectrum PWM controller 104 to control PWM pulse generation. The difference value provided by the error integrator 102 is an average value that reflects a difference between Vout and Vref over time, rather than an instantaneous difference between Vref and the output of the power supply 100. Accordingly, the integrated difference signal generated by the error integrator does not provide for correction of high frequency events, such as ripple or transients, in the output of the power supply 100.

The pulse adaptation circuitry 112 is coupled to the output filter 116 as part of a second feedback loop. The pulse adaptation circuitry 112 monitors the output (e.g., voltage or current output) of the filter 116 and detects short term or high frequency events in the output of the power supply 100. On detection of an event in the power supply output, the pulse adaptation circuitry 112 provides a signal to the spread spectrum PWM controller 104 that causes a modification in a PWM pulse generated by the spread spectrum PWM controller 104 to correct for the event. For example, if the pulse adaptation circuitry 112 detects an event in the power supply output that is indicative of power supply ripple exceeding a predetermined threshold, then the pulse adaptation circuitry 112 can generate a signal that causes a modification of the pulses generated by the spread spectrum PWM controller 104 to reduce the ripple to below the threshold. Similarly, if the pulse adaptation circuitry 112 detects a transient in the output of the filter 116 (such as a sudden change in load at the output of the power supply 100), the pulse adaptation circuitry can generate a signal that causes the spread spectrum PWM controller 104 to generate PWM pulses to compensate for the transient.

The spread spectrum PWM controller 104 includes circuitry, such as linear feedback shift register (LFSR) 106 and counter 108, that randomizes the timing of PWM pulses generated within a predetermined bandwidth. For example, the LFSR 106 may generate a pseudo-random value specifying a pulse width, and the counter 108 may time a pulse based on the pseudo-random value and a clock signal. The active pulse correction circuitry 110 can modify the timing of randomized PWM pulses being generated based on the information provided by the LFSR 106. The pulse timing modifications correct for high frequency events detected in the output of the power supply 100 by the pulse adaptation circuitry 112, and the modifications are based on the signals provided by the pulse adaptation circuitry 112. The events detected by the pulse adaptation circuitry 112 are not detectable via the difference signal generated by the error integrator 102. The pulse timing modifications provided by the active pulse correction circuitry 110 may include modification of PWM pulse rising and/or falling edge timing (e.g., relative to edge time based solely on the LFSR output). For example, if ripple exceeding a threshold is detected by the pulse adaptation circuitry 112 in the output of the power supply 100, then the active pulse correction circuitry 110 in conjunction with the pulse adaptation circuitry may change the PWM pulse timing (e.g., decrease inter-pulse duration by moving a pulse edge) to reduce ripple.

Figure 2:
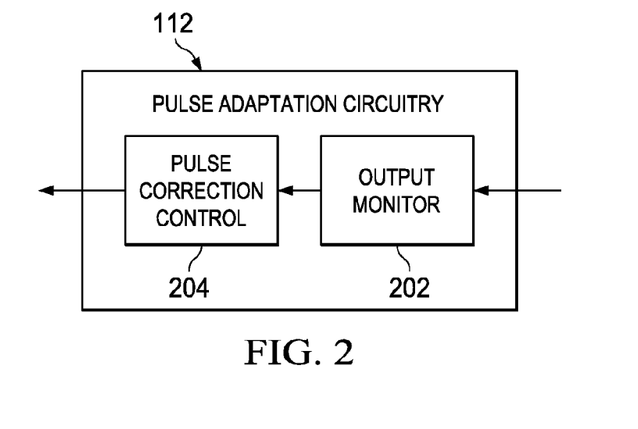
FIG. 2 is a block diagram of pulse adaptation circuitry in accordance with various embodiments.

FIG. 2 shows a block diagram of pulse adaptation circuitry 112 in accordance with various embodiments. The pulse adaptation circuitry 112 includes output monitor 202 and pulse correction control circuitry 204. The output monitor 202 is coupled to the output of the power supply 100, and detects events in the voltage and/or current output of the power supply 100. For example, the output monitor may identify instantaneous excursions of the output of the power supply 100 beyond a predetermined threshold. On identification of an event by the output monitor 202, the pulse correction control circuitry 204 generates signals that direct the active pulse correction circuitry 110 to modify the PWM pulses being generated to compensate for the event and improve the output of the power supply 100.

Figure 3:
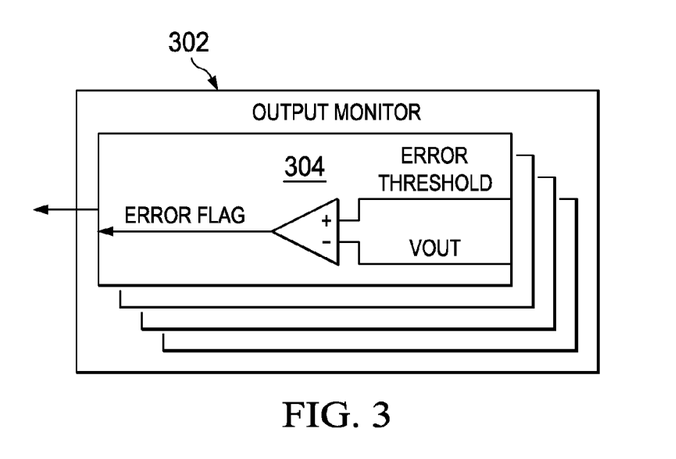
FIG. 3 is a block diagram of power supply output monitoring circuitry in accordance with various embodiments.

FIG. 3 shows a block diagram of power supply output monitoring circuitry 302 in accordance with various embodiments. The output monitoring circuitry 302 may serve as the output monitor 202. The output monitoring circuitry 302 includes multiple comparators 304, each of which compare the output of the output filter 116 to a different error threshold value. The output of each comparator 304 is a flag indicating that the output of the power supply 100 has exceeded the threshold. Thus, the comparators 304 may define error bands, and the different error bands may indicate a different modification to be applied to a pulse generated by the PWM controller 104. Based on the flags asserted, that is the error bands in which a power supply output event is detected, the pulse correction control circuitry 204 determines what modifications are to be applied to the PWM pulses. For example, the pulse correction control circuitry 204 select different pulse modifications for an event detected in higher band and an event detected in a lower error band.

Some embodiments of the output monitor 202 may employ detection techniques other than analog comparators. For example, some embodiments of the output monitor 202 may include an analog-to-digital converter to digitize the output of the power supply 100 and comparators to compare the digitized power output values to predetermined error threshold values that specify error bands.

In some embodiments of the output monitor 202, in addition to detecting instantaneous events in the output of the power supply 100, the output monitor 202 can maintain a history of power supply output values (e.g., a sequence of output values over a predetermined time interval). For each sequence of output values, the pulse correction control circuitry 204 may apply a corresponding pulse correction or sequence.

Figure 4:
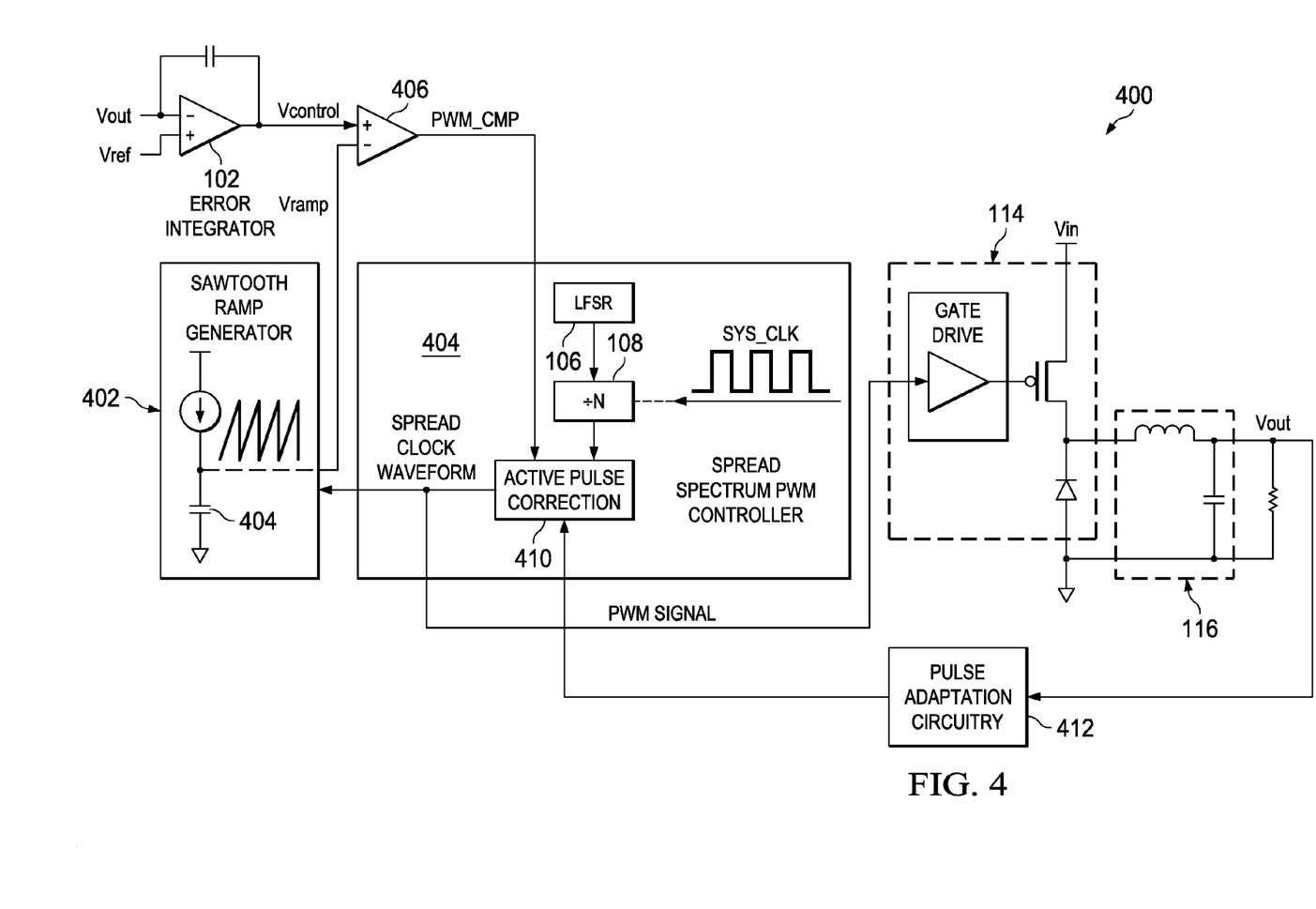
FIGS. 4 and 5 are block diagrams of switching mode power supplies that include adaptive spread spectrum pulse generation in accordance with various embodiments.

FIG. 4 shows a block diagram of switching mode power supply 400 that includes adaptive spread spectrum pulse generation in accordance with various embodiments. The power supply 400 is similar to, and is an embodiment of the power supply 100 described herein. The power supply 400 includes a ramp generator 402 and a comparator 406. The ramp generator 402 generates a sawtooth ramp (or other shaped ramp (such as triangular or dual edged sawtooth) or PWM signal) signal having slope controlled by a signal generated via the active pulse correction circuitry 410. In some embodiments, the active pulse correction circuitry 410 may generate a current that controls the slope of the ramp. The slope of the ramp may be increased or decreased by changing the current, which in turn may result in a corresponding decrease or increase in PWM pulse width. The comparator 406 compares ramp voltage to the integrated difference voltage generated by the error integrator 406.

The current applied in the ramp generator 402 may be determined based on the LFSR 106 output value and modifications selected based on events detected by the pulse adaptation circuitry 412. If the pulse adaptation circuitry 412 detects an event (e.g., power supply output exceeding a threshold), then the active pulse correction circuitry 410 may change the current applied to ramp generation, at any time before or during generation of a ramp pulse, to change the timing of a PWM pulse generated in conjunction with the ramp pulse.

Some embodiments of the switching power supply 400 may change the slope of ramp pulses generated by the ramp generator 402 by changing the value of the capacitor 404, rather than by changing the current applied to ramp generation as described above. In such embodiments, control signals generated by the pulse adaptation circuitry 412 or the active pulse correction circuitry 410 may adaptively set the capacitance value to be applied in ramp pulse generation.

Some embodiments of a switching mode power supply that includes adaptive spread spectrum pulse generation as disclosed herein may apply a timer, such as a counter, to generate PWM pulse timing. In such embodiments, control signals generated by the pulse adaptation circuitry 412 or the active pulse correction circuitry 410 may adaptively adjust the value of the counter to modify the PWM pulse width.

Figure 5:
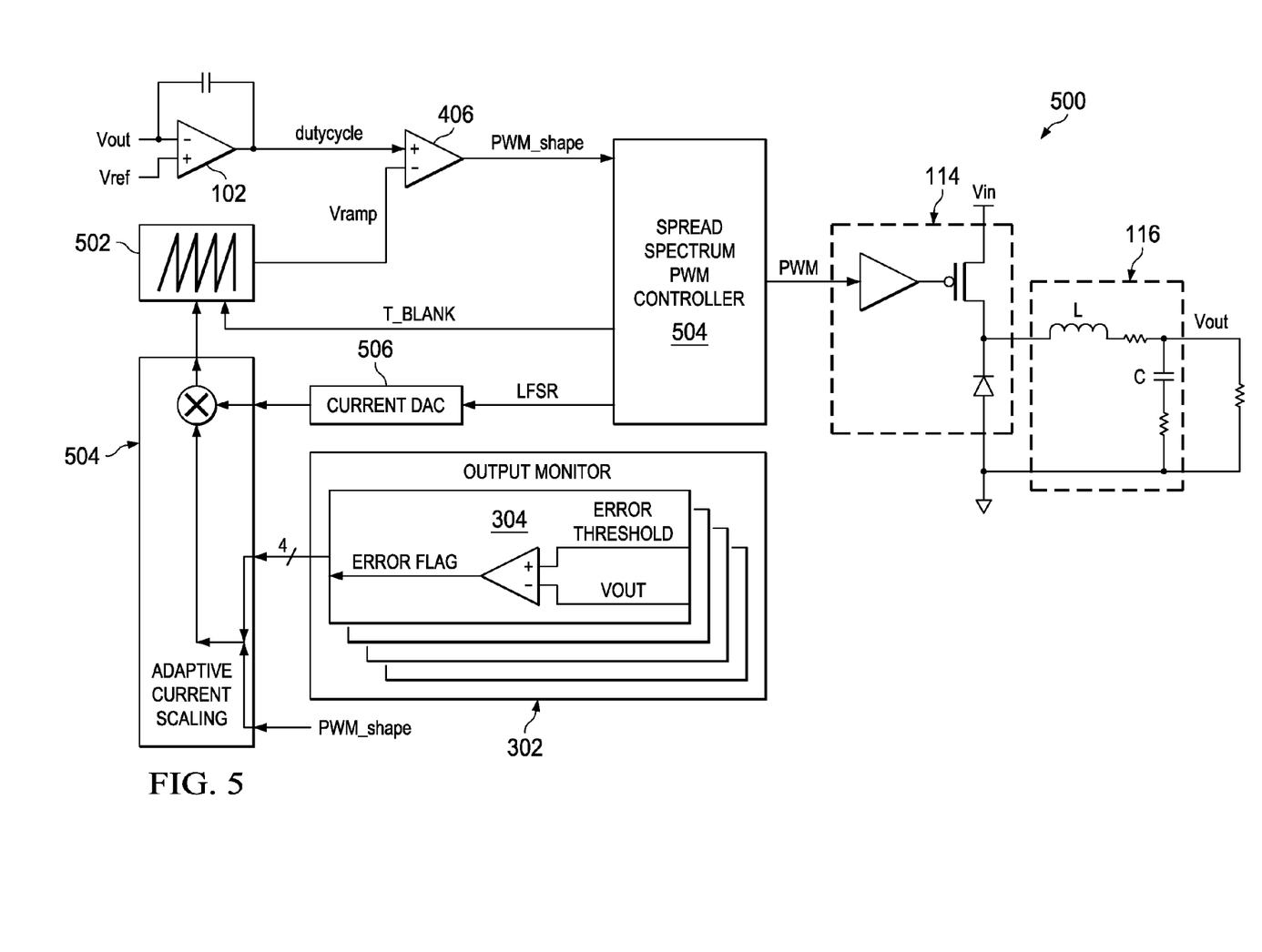

FIG. 5 shows a block diagram of a switching mode power supply 500 that is an embodiment of the power supply 400 shown in FIG. 4. The power supply 400 is an embodiment of the power supply 100. More specifically, FIG. 5 shows an implementation of the pulse adaptation circuitry 412 and active pulse correction circuitry 410 shown in FIG. 4, where the adaptive current scaling 504, current DAC 506, and output monitor 302 are components of pulse adaptation circuitry 412 and active pulse correction circuitry 410 shown in FIG. 4.

The power supply 500 controls ramp slope to vary PWM pulse timing. The PWM controller 504 includes an LFSR to randomize PWM pulse width. The current digital-to-analog converter (DAC) 506 generates a current corresponding to a value provided by the LFSR. The current generated by the DAC 506 is scaled by adaptive current scaling circuitry 504 in accordance with an error band in which an event in the output of the power supply 500 is detected by the output monitor 302. Changing the current provided to the ramp generator 502, changes the slope of the ramp generated, which in turn changes the timing (width, leading edge timing, and/or trailing edge timing) of a PWM pulse generated based on the ramp timing.

Figure 6:
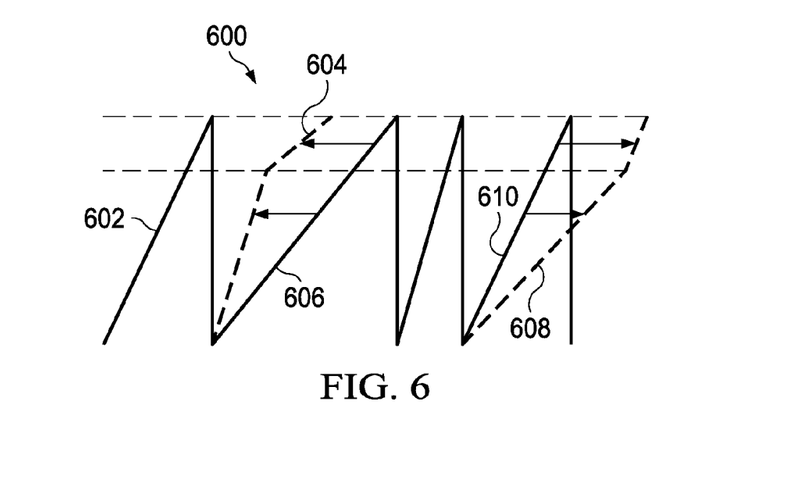
FIG. 6 is a timing diagram of ramp adjustment for adaptive pulse generation in a switching mode power supply in accordance with various embodiments.

FIG. 6 shows a diagram of ramp adjustment for adaptive pulse generation signal generated in a switching mode power supply in accordance with various embodiments. A set of ramp pulses 602 are generated based solely on an LFSR output value. The width of the pulses 602 are randomized in accordance with the varying LFSR output value. Pulses 602 represent randomized ramp pulses as may be generated based solely on LFSR output. The ramp pulse 604 has been adjusted relative to ramp pulse 606. The initial slope of ramp pulse 604 is greater than that of ramp pulse 606, and the slope of ramp pulse 604 is reduced during ramp pulse generation. Both the initial and final slopes of the ramp pulse 604 may result from events detected in the output of switching mode power supply 500 by the output monitor 302. Similarly, the initial slope of ramp pulse 608 is less than that of ramp pulse 610, and the slope of ramp pulse 608 is increased during ramp pulse generation. By modifying the slopes of the ramp pulses responsive to detection of events such as ripple and transients, the power supply 500 adjusts PWM pulse timing to improve output ripple and transient response, while maintaining a low level of EMI. In some embodiments of the switching mode power supply disclosed herein, EMI is reduced relative to conventional spread spectrum PWM while output ripple is reduced and transient response is improved.

Figure 7:
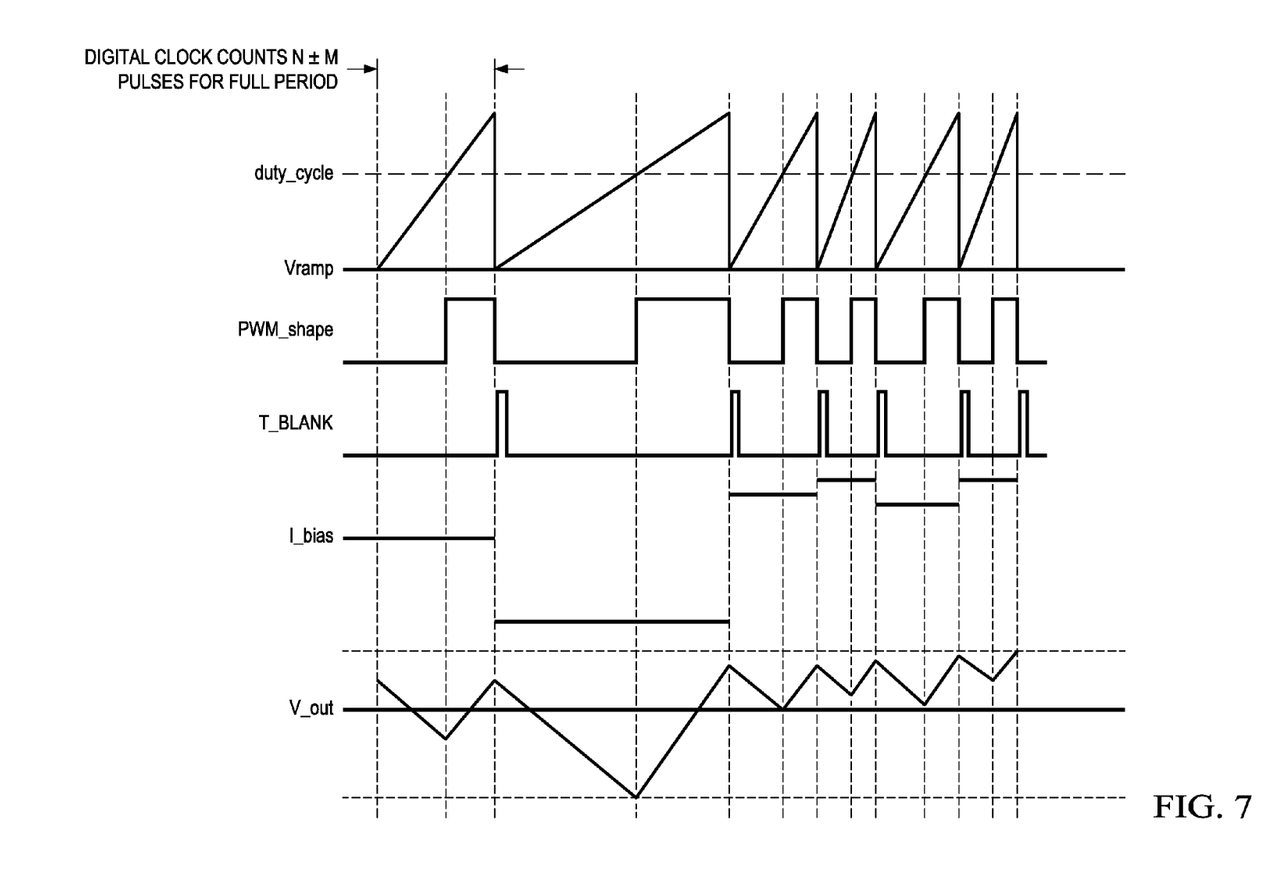
FIG. 7 is a timing diagram of PWM pulse generation in a conventional switching mode power supply.

FIG. 7 shows PWM pulse generation in a conventional spread spectrum switching mode power supply. The ramp pulses are generated based solely on LFSR output values. The current driving ramp generation (I_bias) and power supply output voltage (V_out) are also shown.

Figure 8:
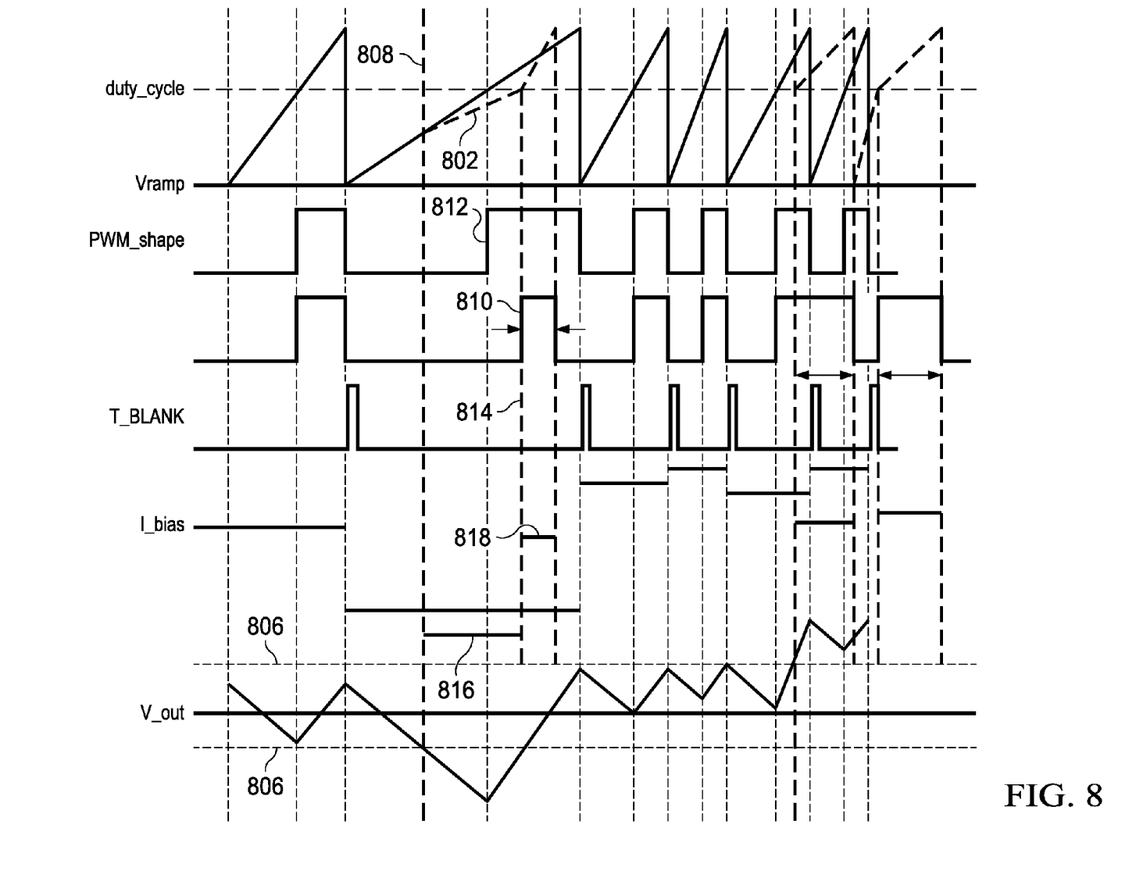
FIG. 8 is a timing diagram of PWM pulse generation in a switching mode power supply that includes adaptive spread spectrum pulse generation in accordance with various embodiments.

FIG. 8 shows PWM pulse generation in a switching mode power supply that includes adaptive spread spectrum pulse generation in accordance with various embodiments. The signals generated by a conventional spread spectrum switching mode power supply are repeated from FIG. 7 for comparison to the adaptively generated signals. FIG. 7 shows ripple control thresholds 806 set for the power supply output voltage. At time 808 the output voltage exceeds the ripple threshold 806. The output monitor 302 detects the event, and in response, the current applied to ramp generation is reduced and the slope of the ramp 802 is reduced. Reducing the slope of the ramp 802 delays the leading edge of the resulting PWM pulse 810 relative to conventional PWM pulse 812. The timing of PWM pulse 810 is further modified (the falling edge is moved relative to pulse 812) by increasing the slope of the ramp 802 at time 814. Changes in ramp generation current (I_bias) applied to produce the modified ramp slopes are shown at 816 and 818.

Modifications are possible in the described embodiments, and other embodiments are possible, within the scope of the claims.

What is claimed is:

1. A switching mode power supply, comprising:
    an output filter configured to provide output of the switching mode power supply;
    a driver coupled to the output filter and configured to switch current to the output filter; and
    a pulse width modulator configured to generate pulses that control switching of current by the driver, the pulse width modulator including: spread spectrum logic configured to randomize timing of the pulses generated by the pulse width modulator, including a counter configured to control the randomized timing of the pulses that control switching of current by the driver; and pulse adaptation circuitry;
    wherein the pulse adaptation circuitry is configured to: identify an instantaneous excursion of the output of the switching mode power supply beyond a predetermined threshold; and change a count value of the counter to modify the randomized timing of the pulses produced by the pulse width modulator based on the identified instantaneous excursion.

2. The power supply of claim 1, further comprising a ramp generator coupled to the pulse width modulator and the pulse adaptation circuitry, wherein the pulse adaptation circuitry changes a slope of a ramp based on the identified instantaneous excursion.

3. The power supply of claim 2, wherein the pulse adaptation circuitry changes the slope of the ramp during ramp generation.

4. The power supply of claim 2, wherein the pulse adaptation circuitry changes the slope by adjusting at least one of a current applied to generate the ramp and a capacitance charged to generate the ramp.

5. The power supply of claim 1, wherein the pulse adaptation circuitry includes a comparator that compares the output of the switching mode power supply to the predetermined threshold to identify the instantaneous excursion.

6. The power supply of claim 1, wherein the pulse adaptation circuitry includes a plurality of comparators, wherein each of the comparators compares the output of the switching mode power supply to a different threshold, and the pulse adaptation circuitry is configured to select a modification of the randomized timing based on which of the comparators identifies an instantaneous excursion of the output of the switching mode power supply beyond a threshold.

7. The power supply of claim 1, wherein the pulse adaptation circuitry includes: an analog-to-digital converter to digitize the output of the switching mode power supply; and comparator logic to compare the digitized output of the switching mode power supply to the predetermined threshold to identify the instantaneous excursion.

8. The power supply of claim 1, wherein the pulse adaptation circuitry includes an amplifier that amplifies the output of the switching mode power supply, and the pulse adaptation circuitry is configured to select a modification of the randomized time based on an amplitude of the amplified output of the switching mode power supply.

9. The power supply of claim 1, wherein the pulse adaptation circuitry is configured to: maintain a history defining values of the output of the switching mode power supply over an interval, and select a modification of the randomized timing based on the history.

10. The power supply of claim 1, wherein the pulse adaptation circuitry is configured to monitor at least one of voltage and current output of the switching mode power supply to identify the instantaneous excursion.

11. A switching mode power supply, comprising:
    an output filter configured to provide output of the switching mode power supply;
    a driver coupled to the output filter and configured to switch current to the output filter;
    a pulse width modulator configured to generate pulses that control switching of current by the driver, the pulse width modulator including: spread spectrum logic configured to randomize timing of the pulses generated by the pulse width modulator; a first feedback loop configured to generate an integrated difference of the switching mode power supply and a reference voltage that defines a target output voltage of the switching mode power supply; and a second feedback loop;
    wherein the second feedback loop is configured to: identify an instantaneous excursion of the output of the switching mode power supply beyond a predetermined threshold; and modify the randomized timing of the pulses produced by the pulse width modulator based on the identified instantaneous excursion.

12. The power supply of claim 11, further comprising a ramp generator coupled to the pulse width modulator and the second feedback loop, wherein the second feedback loop is configured to: change a slope of the ramp based on the identified instantaneous excursion; change the slope of the ramp during ramp generation; and change the slope by adjusting one of a current applied to generate the ramp and a capacitance charged to generate the ramp.

13. The power supply of claim 11, further comprising a counter configured to control the randomized timing of the pulses that that control switching of current by the driver, wherein the second feedback loop is configured to change a count value of the counter based on the identified instantaneous excursion.

14. The power supply of claim 11, wherein the pulse adaptation circuitry includes a plurality of comparators, wherein each of the comparators compares the output of the switching mode power supply to a different threshold, and the second feedback loop is configured to select a modification of the randomized timing based on which of the comparators identifies the instantaneous excursion of the output of the switching mode power supply beyond a threshold.

15. The power supply of claim 11, wherein the second feedback loop includes: an analog-to-digital converter to digitize the output of the switching mode power supply; and comparator logic to compare the digitized output of the switching mode power supply to the predetermined threshold to identify the instantaneous excursion.

16. The power supply of claim 11, wherein the second feedback loop is configured to: identify ripple in the output of the switching mode power supply based on the instantaneous excursion; and responsive to identification of ripple, modify the randomized timing of the pulses produced by the pulse width modulator to reduce amplitude of the ripple.

17. A switching mode power supply, comprising:
- an output filter configured to provide output of the switching mode power supply;
- a driver coupled to the output filter and configured to switch current to the output filter;
- a pulse width modulator configured to generate pulses that control switching of current by the driver, the pulse width modulator including: spread spectrum logic configured to randomize timing of the pulses generated by the pulse width modulator; a first feedback loop configured to generate an integrated difference of the switching mode power supply and a reference voltage that defines a target output voltage of the switching mode power supply; and a second feedback loop;
- wherein the second feedback loop is configured to: monitor the output of the switching mode power supply; maintain a history defining values of the output of the switching mode power supply over an interval, and modify the randomized timing of the pulses produced by the pulse width modulator based on the history.

18. The power supply of claim 17, wherein the second feedback loop is configured to monitor the output of the switching mode power supply by tracking one of voltage or current output of the switching mode power supply.

19. The power supply of claim 17, wherein the second feedback loop is configured to: identify transients in the output of the switching mode power supply based on the history; and responsive to identification of a transient, modify the randomized timing of the pulses produced by the pulse width modulator to compensate for the transient.

* * * * *